United States Patent [19]

Netznik

[11] Patent Number: 4,635,327
[45] Date of Patent: Jan. 13, 1987

[54] QUICK DISCONNECT LOCKING COUPLER

[76] Inventor: Frederick P. Netznik, 8556 Central Park Ave., Skokie, Ill. 60076

[21] Appl. No.: 636,748

[22] Filed: Aug. 1, 1984

[51] Int. Cl.$^4$ .................................................. E05B 69/00
[52] U.S. Cl. ..................................... 24/653; 403/381; 403/328; 292/60
[58] Field of Search ................. 24/653; 403/327, 328, 403/325, 324, 381, 360, 316; 292/59, 60, 57; 248/408, 409

[56] References Cited

U.S. PATENT DOCUMENTS

| | | | |
|---|---|---|---|
| 1,714,196 | 5/1929 | Vara | 292/60 |
| 3,179,457 | 4/1965 | Johnson | 292/60 X |
| 3,184,196 | 5/1965 | Dent | 403/381 |
| 3,337,245 | 8/1967 | Prange | 403/327 |
| 3,685,865 | 8/1972 | Young | 403/328 X |
| 4,165,854 | 8/1979 | Duly | 403/328 X |
| 4,385,851 | 5/1983 | Bellamy | 292/59 X |

*Primary Examiner*—Peter A. Aschenbrenner
*Attorney, Agent, or Firm*—Emrich & Dithmar

[57] ABSTRACT

A quick disconnect mechanical coupler includes a housing having a longitudinal slot within which is positioned an elongated coupling pin which is displaceable within the slot along the length thereof. A first end of the housing is adapter to receive a mounting lug coupled to a first structure while a lateral portion of the housing is adapted for coupling to a second structure. With the mounting lug positioned in the first end portion of the housing, the elongated pin, which includes a knob at one end, is spring-biased in a firt direction for insertion in an aperture in the mounting lug to securely couple the housing thereto. Displacement of the coupling pin in a second, opposite direction disengages the housing from the lug and disconnects the first and second structures. The pin is provided with first and second locking projections positioned along the length thereof and extending transversely therefrom. The housing includes first and second linear slots oriented transversely relative to the coupling pin and respectively adapted to receive the first locking projection when the pin is rotated in the lug engaging configuration and when the pin is rotated after being retracted from the lug in locking the pin in position. A second opposite end of the housing includes a pair of slots radially extending from the longitudinal slot for receiving and engaging the second locking projection with the coupling pin in the lug engaging, locked configuration for inhibiting rotation of the coupling pin.

10 Claims, 6 Drawing Figures

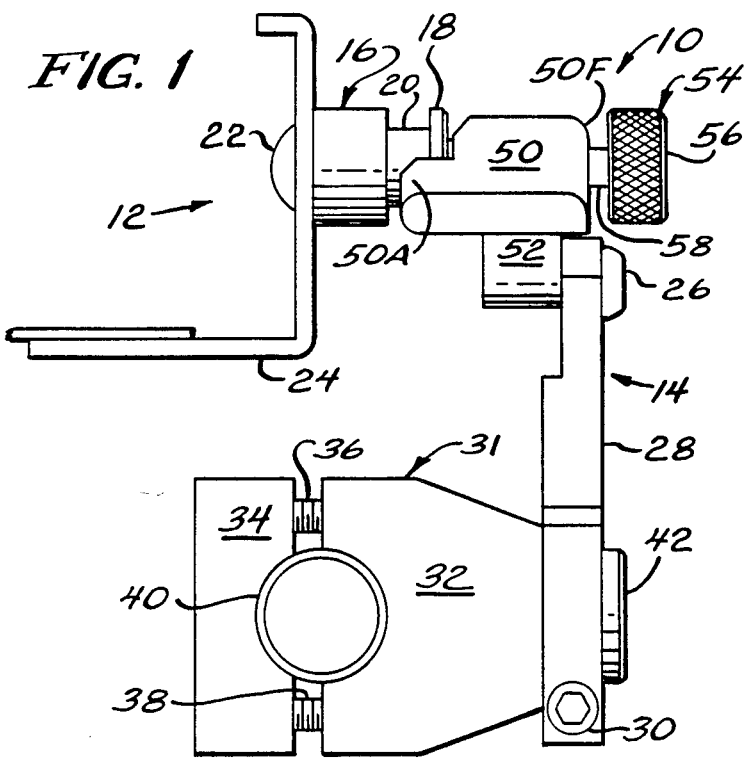
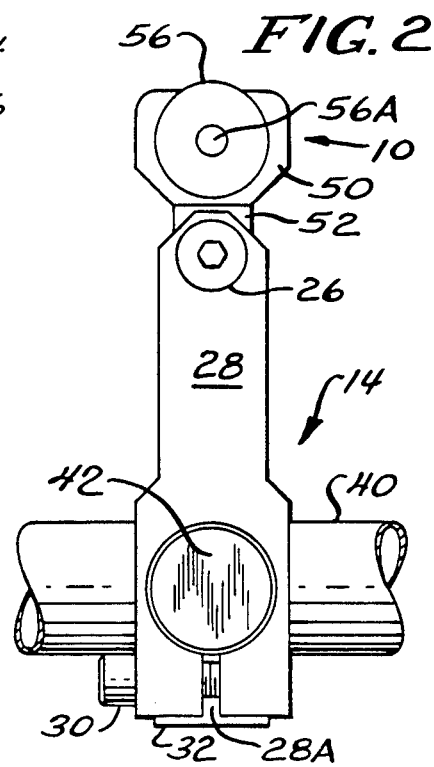
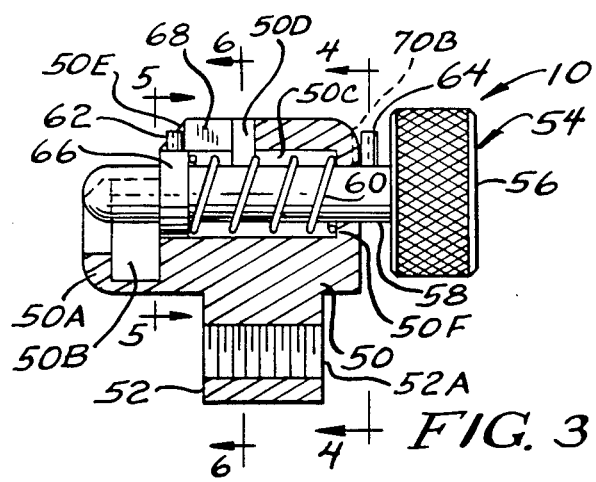
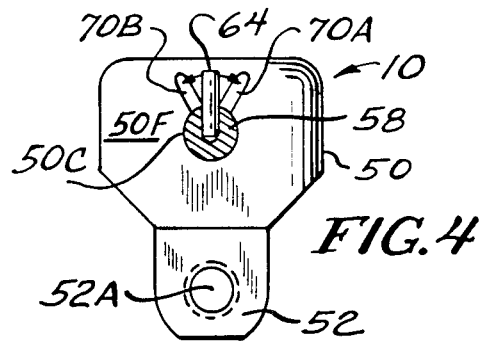
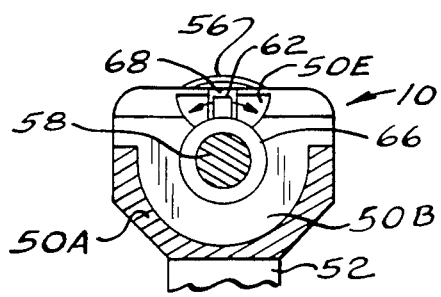
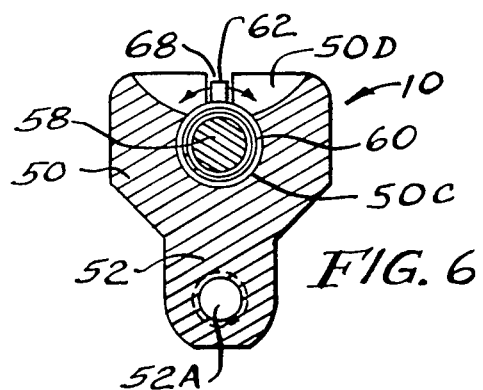

QUICK DISCONNECT LOCKING COUPLER

BACKGROUND OF THE INVENTION

This invention relates generally to mechanical couplers and is particularly directed to a quick disconnect coupler which may be locked in either the engaged or disengaged configuration.

Mechanical couplers for connecting first and second structures come in a variety of forms. These couplers should ideally be inexpensive, easily engaged and disengaged, and safe as well as reliable. The present invention provides all of the aforementioned characteristics in a quick disconnect mechanical coupler which can be securely locked in both the engaged and disengaged configurations in providing safe, strong, and secure mechanical coupling and which requires only one hand for connecting and disconnecting.

OBJECTS OF THE INVENTION

Accordingly, it is an object of the present invention to provide a quick disconnect mechanical coupler.

It is another object of the present invention to provide for the locking of a mechanical coupler in both the engaged and disengaged configurations for increased reliability and safety.

A further object of the present invention is to provide a secure means for coupling first and second structures which may be easily engaged and disengaged using only one hand.

The present invention contemplates a mechanical coupler having a housing which includes a longitudinal channel or slot extending the length thereof. The longitudinal channel is adapted to receive an elongated coupling pin which is displaceable therein along the length thereof. A first end of the housing is adapted to receive a mounting lug having an aperture within which a first end of the pin may be inserted when in the spring-biased, engaged position. A second end of the pin is provided with a knob for grasping and displacing the pin in a second, opposite direction and positioning it in the disengaged position wherein the mounting lug may be removed from the housing. The mounting lug and the housing may be respectively secured to first and second structures which may be connected by the mechanical coupler.

First and second locking fingers or projections are positioned on the coupling pin along the length thereof and extending transversely therefrom. The housing includes first and second slots which are oriented transversely relative to and continuous with the longitudinal channel therein. Rotation of the coupling pin in the extended, engaged position with the first locking finger aligned with the first slot locks the coupler in the engaged configuration. Rotation of the coupling pin in the retracted position with the first locking finger aligned with the second slot locks the coupler in the disengaged configuration.

A second, opposite end of the housing is provided with a pair of linear grooves or detents radially extending from the longitudinal channel so as to receive and engage the second locking finger with the coupling pin rotationally displaced in the extended, engaging position. The coupler may thus be locked in the extended, engaged configuration as well as in the retracted, disengaged configuration.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures in which:

FIG. 1 is a lateral view of a quick disconnect locking coupler connecting first and second structures in accordance with the present invention;

FIG. 2 an end-on view of the quick disconnect locking coupler of FIG. 1;

FIG. 3 is a partially cutaway lateral sectional view of a quick disconnect locking coupler in accordance with the present invention;

FIG. 4 is a sectional view of the quick disconnect locking coupler of FIG. 3 taken along sight line 4—4 therein;

FIG. 5 is a sectional view of the quick disconnect locking coupler of FIG. 3 taken along sight line 5—5 therein; and FIG. 6 is a sectional view of the quick disconnect locking coupler of FIG. 3 taken along sight line 6—6 therein.

DETAILED DESCRIPTION OF THE PREFERRED EMBODIMENT

Referring to FIGS. 1 and 2 there are respectively shown lateral and end-on views of a quick disconnect locking coupler 10 for connecting first and second structures 12 and 14 in accordance with the present invention.

The quick disconnect locking coupler 10 includes a housing 50 within which is positioned a coupling pin 58, to one end of which is mounted a knob 56. The knob 56 in combination with the coupling pin 58 forms a latch mechanism 54 which is linearly displaceable within and along the housing 50.

The housing 50 includes a lower extension 52 thereof which is adapted for coupling to a first bracket 28 of the second structure 14 by means of a coupling pin 26. Coupling pin 26, as well as various other coupling pins described below, may be conventional in nature and typically would be comprised of a screw having a threaded portion for engagement with the lower extension 52 of the housing 50. The second structure 14 further includes a second bracket 31 which is comprised of first and second blocks 32, 34 and coupling pins 36, 38. Securely coupled to the first block 32 is a lug 42 which is inserted within an aperture in the lower portion of the first bracket 28. The lower portion of the first bracket 28 further includes a slot 28A therein. A coupling pin is threadably inserted within a lower portion of the first bracket 28 so as to extend across the slot 28A therein. By tightening the coupling pin 30, the first bracket 28 may be configured so as to securely engage the lug 42 which is coupled to the second bracket 31. Similarly, by tightening threaded coupling pins 36 and 38, the first and second blocks 32, 34 may be tightly drawn together for securely engaging a cylindrical shaft 40 positioned therebetween. The cylindrical shaft 40 may form a part of a larger structure to which it is desired to securely couple the first structure 12.

A first end of the housing 50A is adapted to receive and engage a generally cylindrically shaped mounting lug 16. The mounting lug 16 includes an expanded distal end portion 18 and a recessed intermediate portion 20. With the expanded distal end portion 18 of the mounting lug 16 inserted within a recessed slot 50B of the housing 50, shown in FIG. 3, the distal end portion 50A of the housing is positioned within the recessed intermediate portion 20 of the mounting lug 16 which is thus securely engaged along the length thereof by the housing 50.

The mounting lug 16 is adapted to be coupled to a bracket 24 of the first structure 12 by means of a coupling pin, such as a screw, 22. As in the case of the second structure 14, the first structure 12 may form a portion of a larger apparatus to which it is desired to securely couple the second structure 14.

Referring additionally to FIGS. 3 through 6, there are shown various other views of the quick disconnect locking coupler 10 of the present invention. The longitudinal slot 50C extends the length of the housing 50. The coupling pin 58 positioned within the longitudinal slot 50C similarly extends substantially the entire length of the housing 50 and is linearly and rotationally displaceable within the longitudinal slot 50C. Positioned adjacent a first end of the coupling pin 58 and mounted thereto by means of a mounting collar 66 is a forward locking pin 62. The mounting collar 66 is securely positioned upon the coupling pin 58 in a conventional manner such as by spot welding. Also mounted to the coupling pin 58 adjacent a second end thereof is an aft locking pin 64. A coiled spring 60 is positioned around and along a portion of the length of the coupling pin 58 and between the mounting collar 66 and a proximal end 50F of the housing 50. With the coiled spring 60 positioned between the mounting collar 66 and the proximal end 50F of the housing 50 and in abutting contact therewith, the latch mechanism 54 is biased toward the left as shown in FIG. 3. From FIG. 3, it can be seen that in this position the coupling pin 58 of the latch mechanism 54 will be aligned with and positioned within an aperture in the mounting lug 16 for securely coupling the mounting lug 16 to the coupler 10.

An upper portion of the housing 50 is provided with an upper longitudinal slot 68 which is continuous with the inner longitudinal slot 50C over a portion of the length thereof. With the first locking pin 62 aligned with and positioned within the upper longitudinal slot 68, the latch mechanism 54 may be displaced along its length within the housing 50. An upper portion of the housing 50 immediately adjacent to the upper longitudinal slot 68 is further provided with a forward recessed portion 50E which is adapted to receive the forward locking pin 62 when the coupling pin 58 is rotationally displaced in the extended, engaging configuration. Thus, if the latch mechanism 54 is rotated in the extended, engaging configuration with the coupling pin 58 engaging the mounting lug 16 positioned within the housing 50, the coupling pin 58 may not be withdrawn from the mounting lug 16 and the coupler 10 is locked in the engaged configuration. The coupler may be disconnected by rotating the latch mechanism 54 so that the forward locking pin 62 is aligned with the upper longitudinal slot 68 to permit the coupling pin 58 to be withdrawn from the mounting lug 16 by overcoming the biasing force applied to the latch mechanism 54 by the spring 60.

Positioned in an upper portion of the housing 50 and aligned generally transverse relative to the length of the coupling pin 58 and having a generally semicircular shape is a transverse groove 50D. The transverse groove 50D is adapted to receive the forward locking pin 62 when the coupling pin 58 is displaced rightward in positioning the latch mechanism 54 in the retracted, disengaged configuration. With the coupling pin 58 displaced rightward such that the forward locking pin 62 passes through the upper longitudinal slot 68 and is in alignment with the transverse groove 50D, the latch mechanism 54 may be rotated for positioning the forward locking pin 62 within the transverse groove 50D. In this configuration the latch mechanism 54 is securely locked in the retracted or disengaged configuration and the coupler 10 may be disengaged from the mounting lug 16. When the latch mechanism 54 is rotated such that the forward locking pin 62 is in alignment with the upper longitudinal slot 68, the biasing action of the spring 60 will force the latch mechanism 54 leftward and into the extended or engaging configuration.

Referring specifically to FIGS. 3 and 4, the proximal end 50F of the housing 50 is provided with right and left locking grooves 70A and 70B. The right and left locking grooves 70A, 70B are radially aligned with the inner longitudinal slot 50C in the housing 50 and extend therefrom. The right and left locking grooves 70A, 70B are adapted to receive and engage the aft locking pin 64 with the latch mechanism 54 in the extended, engaging configuration and with the coupling pin 58 rotationally displaced such that the forward locking pin 62 is positioned within the forward recessed portion 50E of the housing 50. The biasing action of the coil spring 60 ensures that the aft locking pin 64 is positioned within either the right or left locking groove 70A, 70B when the latch mechanism 54 has been rotationally displaced in the extended configuration. With the aft locking pin 64 positioned within and engaged by either the right or left locking groove 70A, 70B, rotational displacement of the latch mechanism 54 is inhibited and the coupler 10 is locked in the extended, engaged configuration. The coupler 10 may be unlocked from this configuration and positioned in the retracted, disengaged configuration by grasping the knob 56 and displacing the latch mechanism 54 rightward in removing the aft locking pin 64 from either the right or left locking groove 70A, 70B. Once the aft locking pin 64 has been removed from either of these locking grooves, the latch mechanism 54 is then rotated so as to align the forward locking pin 62 with the upper longitudinal slot 68 in permitting the latch mechanism 54 to be displaced rightward whereby the coupling pin 58 is withdrawn from the mounting lug 16 positioned within the housing 50. Thus, as shown in FIG. 3, both the forward and aft locking pins 62, 64 may be used to lock the latch mechanism 54 in the extended, engaging configuration. Similarly, with the latch mechanism 54 in the withdrawn position, the forward locking pin 62 may be positioned within the transverse groove 50D in the housing 50 for locking the coupler in the retracted, disengaged configuration.

There has thus been shown a quick disconnect mechanical coupler which is easily configured in either an engaged or disengaged configuration for securely connecting two structures. The quick disconnect coupler may be locked in an extended, engaged configuration as well as in a retracted, disengaged configuration by means of a simple manual operation requiring only a single hand.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A coupler for engaging generally cylindrical member having an aperture in one end thereof and including a recessed portion around the periphery thereof adjacent to said one end, said coupler comprising:

a housing having concave receptacle means adjacent a first end thereof for receiving and engaging the cylindrical member adjacent said one end thereof, said housing further including a bore continuous with said engaging means and extending the length of said housing and a groove and a first slot extending from said bore and oriented generally transverse with respect thereto wherein said groove is positioned adjacent the first end of said housing and said first slot is located in an intermediate portion of said housing;

an elongated coupling pin positioned within said bore and linearly displaceable therein between a first extended position wherein a first end of said coupling pin is positioned within said aperture for engaging said cylindrical member and a second retracted position, said coupling pin including first locking means positioned within said groove when said coupling pin is rotated in said first extended position for locking said coupler in an engaged configuration and wherein said first locking means is positioned within said first slot when said coupling pin is rotated in a second retracted position wherein said coupling pin does not engage said lug for locking said coupler in a disengaged configuration; and biasing means coupled to said coupling pin for urging said coupling pin toward said first extended position.

2. A coupler in accordance with claim 1 further comprising grasping means coupled to a second end of said coupling pin to facilitate manual displacement thereof.

3. A coupler in accordance with claim 1 wherein said coupling pin further includes second locking means positioned thereon adjacent a second, opposite end of said housing and wherein said second end of said housing includes detent means for receiving and engaging said second locking means when said coupling pin is rotated in said first extended position for locking said rotated coupling pin in position.

4. A coupler in accordance with claim 3 wherein said detent means includes an elongated groove on the second end of said housing extending radially from said bore therein.

5. A coupler in accordance with claim 4 wherein said second locking means comprises a locking pin mounted to and extending transversely from said coupling pin.

6. A coupler in accordance with claim 1 wherein said generally cylindrical member is mounted to a first structure and said housing is mounted to a second structure.

7. A coupler in accordance with claim 1 wherein said biasing means comprises a coil spring.

8. A coupler in accordance with claim 7 wherein said coil spring is positioned on said coupling pin intermediate and in abutting contact with said housing and said first locking means.

9. A coupler in accordance with claim 1 further comprising a second slot continuous with and extending over a portion of the length of said bore and continuous with said groove and said first slot for providing for the displacement of said first locking means therebetween.

10. A coupler in accordance with claim 1 wherein said first locking means comprises a locking pin mounted to and extending transversely from said coupling pin.

* * * * *

UNITED STATES PATENT AND TRADEMARK OFFICE
CERTIFICATE OF CORRECTION

PATENT NO. : 4,635,327
DATED : January 13, 1987
INVENTOR(S) : Frederick P. Netznik It is certified that error appears in the above—identified patent and that said Letters Patent is hereby corrected as shown below:

In the Abstract on the cover page, line 10, "firt" should be -- first --.

Column 5, line 12, after "engaging" insert -- a --.

Signed and Sealed this

Twenty-first Day of April, 1987

Attest:

DONALD J. QUIGG

*Attesting Officer*    *Commissioner of Patents and Trademarks*